US012682584B2

(12) United States Patent
Nichols et al.

(10) Patent No.: US 12,682,584 B2
(45) Date of Patent: Jul. 14, 2026

(54) AUGMENTED REALITY DEVICE OPERATION WITH ROBOTIC TOTAL STATION

(71) Applicant: Trimble Inc., Westminster, CO (US)

(72) Inventors: Mark Nichols, Christchurch (NZ);
Thomas Peterson, Christchurch (NZ);
Adam Bursill, Christchurch (NZ)

(73) Assignee: Trimble Inc., Westminster, CO (US)

( * ) Notice: Subject to any disclaimer, the term of this patent is extended or adjusted under 35 U.S.C. 154(b) by 162 days.

(21) Appl. No.: 18/658,554

(22) Filed: May 8, 2024

(65) Prior Publication Data

US 2025/0349084 A1      Nov. 13, 2025

(51) Int. Cl.
*G06T 19/00*      (2011.01)
*G06T 5/50*       (2006.01)
*G06T 19/20*      (2011.01)

(52) U.S. Cl.
CPC .............. *G06T 19/006* (2013.01); *G06T 5/50*
(2013.01); *G06T 19/20* (2013.01); *G06T*
*2207/20221* (2013.01); *G06T 2219/2004*
(2013.01); *G06T 2219/2016* (2013.01)

(58) Field of Classification Search
CPC ......... G06T 19/006; G06T 5/50; G06T 19/20;
G06T 2207/20221; G06T 2219/2004;
G06T 2219/2016; G01C 15/002; G06F
3/0304; G06F 3/0346; G06F 3/011
See application file for complete search history.

(56) References Cited

U.S. PATENT DOCUMENTS

| | | | |
|---|---|---|---|
| 2019/0094021 A1 | 3/2019 | Singer | |
| 2019/0285413 A1* | 9/2019 | Hallett | ................... G01S 19/00 |
| 2021/0335035 A1* | 10/2021 | Bursill | ................... G06T 17/05 |
| 2022/0011577 A1 | 1/2022 | Lawver et al. | |

OTHER PUBLICATIONS

Extended European Search Report for Application No. 24222740.3-1218, mailed Jun. 5, 2025, 8 pages.

* cited by examiner

*Primary Examiner* — Haixia Du

(74) *Attorney, Agent, or Firm* — Kilpatrick Townsend & Stockton LLP

(57) ABSTRACT

Techniques for operating an augmented reality (AR) device using a robotic total station (RTS) are described. An RTS reference frame is correlated with an AR reference frame. A set of RTS measurements are received from the RTS including a distance and an angle from the RTS to a reflector of the AR device. An RTS point within the RTS reference frame is determined based on the distance and the angle. An AR point is determined within the AR reference frame based on a set of vision-based or inertia-based measurements. The RTS reference frame and/or the AR reference frame is shifted to align the RTS point with the AR point. The RTS reference frame and/or the AR reference frame is rotated to align an RTS vector formed using the RTS point with an AR vector formed using the AR point.

17 Claims, 9 Drawing Sheets

Determine position of RTS using an
external process
701

Initialization Steps

Track reflector using RTS
703

Determine first and second RTS points
705

Determine first and second AR points
707

Shift AR frame to align second AR point
with second RTS point
709

Calculate angle formed by RTS vector
and AR vector
711

Rotate AR frame by angle
713

700

AUGMENTED REALITY DEVICE OPERATION WITH ROBOTIC TOTAL STATION

BACKGROUND

The recent growth of virtual reality (VR) and augmented reality (AR) technologies has been remarkable. In most implementations, VR and AR systems include devices that allow digitally reproduced images to be presented to a user in a manner wherein they seem to be, or may be perceived as, real. A VR scenario typically involves presentation of digital or virtual image information without transparency to other actual real-world visual input, whereas an AR scenario typically involves presentation of digital or virtual image information as an augmentation to visualization of the actual world around the user. There is a need in the art for improved methods and systems related to VR and AR technology.

SUMMARY

A summary of the inventions are given below in reference to a series of examples. As used below, any reference to a series of examples is to be understood as a reference to each of those examples disjunctively (e.g., "Examples 1-4" is to be understood as "Examples 1, 2, 3, or 4").

Example 1 is a method of operating an augmented reality (AR) device using a robotic total station (RTS), the method comprising: correlating an RTS reference frame with an AR reference frame, the RTS reference frame for tracking positions of the AR device with RTS measurements and the AR reference frame for tracking positions of the AR device with vision-based or inertia-based measurements; receiving a set of RTS measurements from the RTS including a distance and an angle from the RTS to a reflector of the AR device; determining an RTS point within the RTS reference frame based on the distance and the angle; determining an AR point within the AR reference frame based on a set of vision-based or inertia-based measurements; shifting the RTS reference frame and/or the AR reference frame to align the RTS point with the AR point; and rotating the RTS reference frame and/or the AR reference frame to align an RTS vector formed using the RTS point with an AR vector formed using the AR point.

Example 2 is the method of example(s) 1, wherein the RTS vector is formed between the RTS point and a previous RTS point, and wherein the AR vector is formed between the AR point and a previous AR point.

Example 3 is the method of example(s) 1, further comprising: generating a model image based on model data, the shifting of the RTS reference frame and/or the AR reference frame, and the rotating of the RTS reference frame and/or the AR reference frame; and generating a superimposed image by superimposing the model image onto a camera image generated by a camera; and displaying the superimposed image.

Example 4 is the method of example(s) 1, further comprising: determining whether the RTS is tracking the reflector of the AR device at a first time; in response to determining that the RTS is not tracking the reflector of the AR device at the first time: determining an untracked AR point within the AR reference frame; and sending an instruction to the RTS to cause the RTS to rotate toward the untracked AR point.

Example 5 is the method of example(s) 4, further comprising: determining whether the RTS is tracking the reflector of the AR device at a second time after the first time; and in response to determining that the RTS is tracking the reflector of the AR device at the second time, determining the RTS point and the AR point.

Example 6 is the method of example(s) 1, wherein the AR device comprises a camera component including a camera and a target component including the reflector, and wherein the camera component is separable from and configured to removably attach to the target component.

Example 7 is the method of example(s) 1, further comprising: calculating an angle formed by the RTS vector and the AR vector, wherein the RTS reference frame and/or the AR reference frame is rotated by the angle.

Example 8 is a non-transitory computer-readable medium comprising instructions that, when executed by one or more processors, cause the one or more processors to perform operations for operating an augmented reality (AR) device using a robotic total station (RTS), the operations comprising: correlating an RTS reference frame with an AR reference frame, the RTS reference frame for tracking positions of the AR device with RTS measurements and the AR reference frame for tracking positions of the AR device with vision-based or inertia-based measurements; receiving a set of RTS measurements from the RTS including a distance and an angle from the RTS to a reflector of the AR device; determining an RTS point within the RTS reference frame based on the distance and the angle; determining an AR point within the AR reference frame based on a set of vision-based or inertia-based measurements; shifting the RTS reference frame and/or the AR reference frame to align the RTS point with the AR point; and rotating the RTS reference frame and/or the AR reference frame to align an RTS vector formed using the RTS point with an AR vector formed using the AR point.

Example 9 is the system of example(s) 15, wherein the RTS vector is formed between the RTS point and a previous RTS point, and wherein the AR vector is formed between the AR point and a previous AR point.

Example 10 is the system of example(s) 15, wherein the operations further comprise: generating a model image based on model data, the shifting of the RTS reference frame and/or the AR reference frame, and the rotating of the RTS reference frame and/or the AR reference frame; and generating a superimposed image by superimposing the model image onto a camera image generated by a camera; and displaying the superimposed image.

Example 11 is the system of example(s) 15, wherein the operations further comprise: determining whether the RTS is tracking the reflector of the AR device at a first time; in response to determining that the RTS is not tracking the reflector of the AR device at the first time: determining an untracked AR point within the AR reference frame; and sending an instruction to the RTS to cause the RTS to rotate toward the untracked AR point.

Example 12 is the system of example(s) 18, wherein the operations further comprise: determining whether the RTS is tracking the reflector of the AR device at a second time after the first time; and in response to determining that the RTS is tracking the reflector of the AR device at the second time, determining the RTS point and the AR point.

Example 13 is the system of example(s) 15, wherein the AR device comprises a camera component including a camera and a target component including the reflector, and wherein the camera component is separable from and configured to removably attach to the target component.

Example 14 is the system of example(s) 15, wherein the operations further comprise: calculating an angle formed by the RTS vector and the AR vector, wherein the RTS reference frame and/or the AR reference frame is rotated by the angle.

Example 15 is a system comprising: one or more processors; and a non-transitory computer-readable medium comprising instructions that, when executed by the one or more processors, cause the one or more processors to perform operations for operating an augmented reality (AR) device using a robotic total station (RTS), the operations comprising: correlating an RTS reference frame with an AR reference frame, the RTS reference frame for tracking positions of the AR device with RTS measurements and the AR reference frame for tracking positions of the AR device with vision-based or inertia-based measurements; receiving a set of RTS measurements from the RTS including a distance and an angle from the RTS to a reflector of the AR device; determining an RTS point within the RTS reference frame based on the distance and the angle; determining an AR point within the AR reference frame based on a set of vision-based or inertia-based measurements; shifting the RTS reference frame and/or the AR reference frame to align the RTS point with the AR point; and rotating the RTS reference frame and/or the AR reference frame to align an RTS vector formed using the RTS point with an AR vector formed using the AR point.

Example 16 is the system of example(s) 15, wherein the RTS vector is formed between the RTS point and a previous RTS point, and wherein the AR vector is formed between the AR point and a previous AR point.

Example 17 is the system of example(s) 15, wherein the operations further comprise: generating a model image based on model data, the shifting of the RTS reference frame and/or the AR reference frame, and the rotating of the RTS reference frame and/or the AR reference frame; and generating a superimposed image by superimposing the model image onto a camera image generated by a camera; and displaying the superimposed image.

Example 18 is the system of example(s) 15, wherein the operations further comprise: determining whether the RTS is tracking the reflector of the AR device at a first time; in response to determining that the RTS is not tracking the reflector of the AR device at the first time: determining an untracked AR point within the AR reference frame; and sending an instruction to the RTS to cause the RTS to rotate toward the untracked AR point.

Example 19 is the system of example(s) 18, wherein the operations further comprise: determining whether the RTS is tracking the reflector of the AR device at a second time after the first time; and in response to determining that the RTS is tracking the reflector of the AR device at the second time, determining the RTS point and the AR point.

Example 20 is the system of example(s) 15, wherein the AR device comprises a camera component including a camera and a target component including the reflector, and wherein the camera component is separable from and configured to removably attach to the target component.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

A georeferenced three-dimensional (3D) model can be mapped to a real-world coordinate system, allowing the model to be displayed on an augmented reality (AR) device equipped with satellite positioning capabilities. For example, an AR device can be equipped with a Global Positioning System (GPS) or Global Navigation Satellite System (GNSS) receiver that measures the device's precise position relative to the 3D model so that the size and orientation of the 3D model can be properly rendered on a screen. However, such a device may only be operable in outside environments where a high-accuracy geospatial reference frame can be acquired.

Embodiments described herein relate to an AR device that can be operated with a robotic total station (RTS), allowing for indoor and outdoor use independent of the availability of positioning satellites. In some embodiments, a geospatial reference frame can be substituted with a high-accuracy local grid reference frame produced using data measured by the RTS. The RTS can track a lightweight reflector (e.g., a prism) attached to the AR device to produce angle and distance measurements from the RTS to the reflector. The 3D model can be mapped to the local reference frame (referred to as the "RTS reference frame" or simply "RTS frame") so that the 3D model can be displayed in a similar manner as when a geospatial reference frame is utilized.

Figure 1:
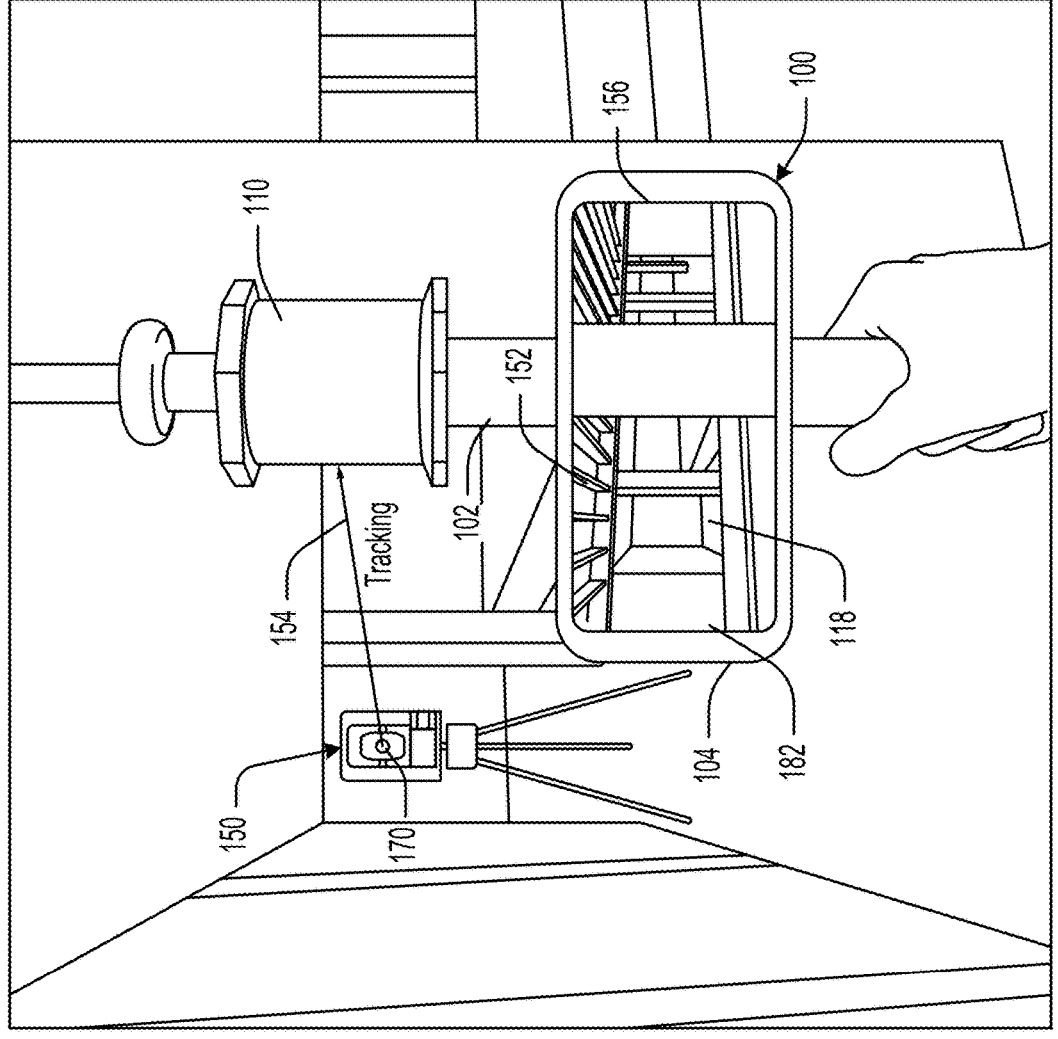
FIG. 1 illustrates an AR device comprising a camera component attached to a target component deployed at a work site.

FIG. 1 illustrates an AR device 100 comprising a camera component 104 attached to a target component 102 deployed at a work site, according to some embodiments of the present disclosure. AR device 100 may be used at a work site or at any location where 3D rendered models may be displayed and superimposed onto images of real-world objects such as the earth, sky, water, stationary objects (e.g., roads, trees, buildings, etc.), movable objects (e.g., people, animals, vehicles, etc.), among other possibilities. Camera component 104 may include a camera (not shown in FIG. 1) for capturing a camera image 118 and a display 156 for displaying a model image 152 (e.g., the mechanical infrastructure of a building) that is superimposed onto camera image 118, collectively referred to as a superimposed image 182. Target component 102 may include a reflector 110, such as a prism, that is mounted on top of target component 102. Reflector 110 may reflect light emitted by an RTS 150 back toward RTS 150. In some examples, when the spatial relationship between RTS 150 and a camera of AR device 100 is known, the RTS measurements may be used to determine the position of the camera, allowing proper placement of model image 152 onto camera image 118.

During operation, a telescope 170 of RTS 150 may be controlled such that an optical path 154 and an optical aiming point associated with telescope 170 may be directed toward reflector 110. RTS 150 may include a motorized head that moves telescope 170 in horizontal and vertical directions. RTS 150 may further include an electronic distance measurement (EDM) device that uses emitted light (e.g., lasers) to measure the distance between RTS 150 and reflector 110 with high accuracy. In some examples, AR device 100 may send instructions to RTS 150 to cause optical path 154 to continue to be directed toward reflector 110. In some examples, RTS 150 may automatically rotate to track reflector 110 as AR device 100 moves relative to RTS 150. In some examples, a user of RTS 150 may perform a manual adjustment of telescope 170 to direct optical path 154 toward reflector 110. During operation, AR device 100 may correlate the RTS reference frame with an AR reference frame (or simply "AR frame") by performing the initialization steps described in reference to FIG. 7.

Each of camera component 104 and target component 102 may comprise one or more structural components to support the attachment or integration of other components. For example, target component 102 may include a frame that allows attachment or integration of reflector 110 to the frame. When attached or integrated to the frame, reflector 110 may have a known physical relationship to AR device 100. As another example, camera component 104 may include a structural component that allows camera component 104 to be removably or permanently attached to target component 102. Similarly, target component 102 may include a structural component that allows target component 102 to be removably or permanently attached to camera component 104. The above-described structural components may include screws, bolts, nuts, brackets, clamps, magnets, adhesives, etc., to assist in attachment of the various components.

Figure 2B:
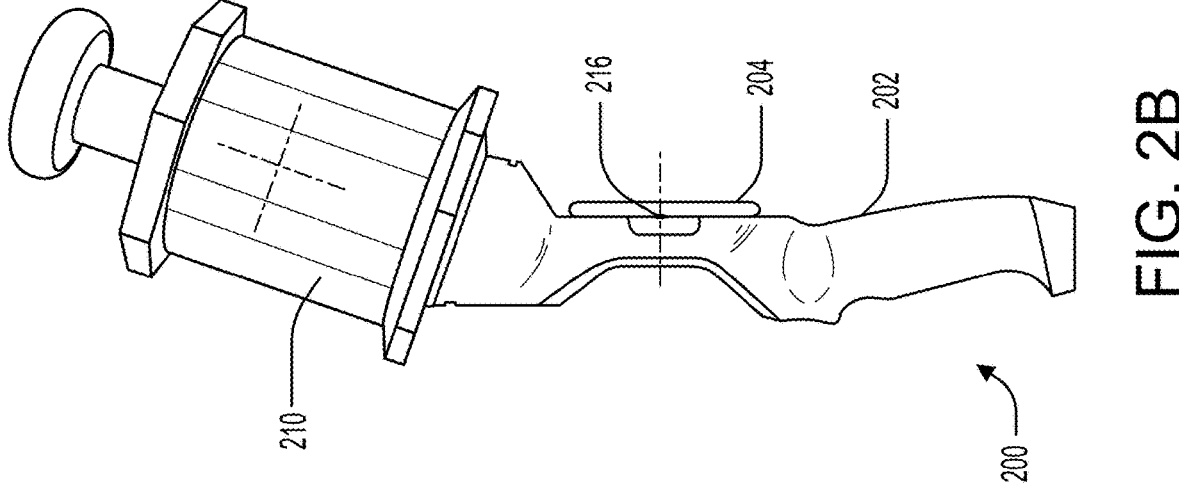
FIGS. 2A and 2B illustrate front and side views of an AR device when a camera component is attached to a target component.
Figure 2A:
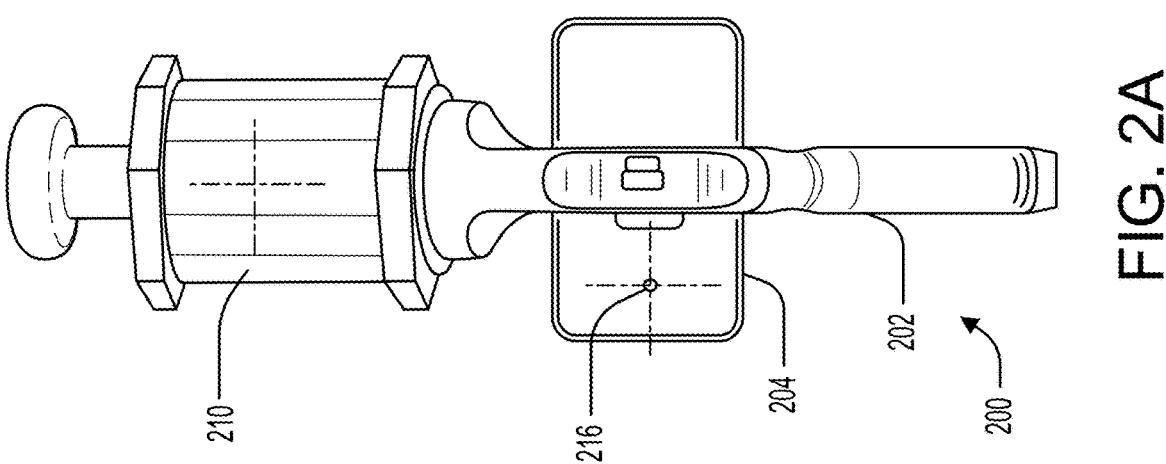

FIGS. 2A and 2B illustrate front and side views of an AR device 200 when a camera component 204 is attached to a target component 202, according to some embodiments of the present disclosure. In the illustrated example, the positions and orientations of a reflector 210 and a camera 216 are indicated by crosshairs. The position of camera 216 may correspond to a point where the camera aperture is located (in accordance with the pinhole camera model). When camera component 204 is rigidly attached to target component 202, detection of the orientation and position of either of the devices can be used to obtain the orientation and position of the other device. For example, the position of camera 216 can be found by applying known horizontal and vertical offsets to the position of reflector 210.

Figure 3:
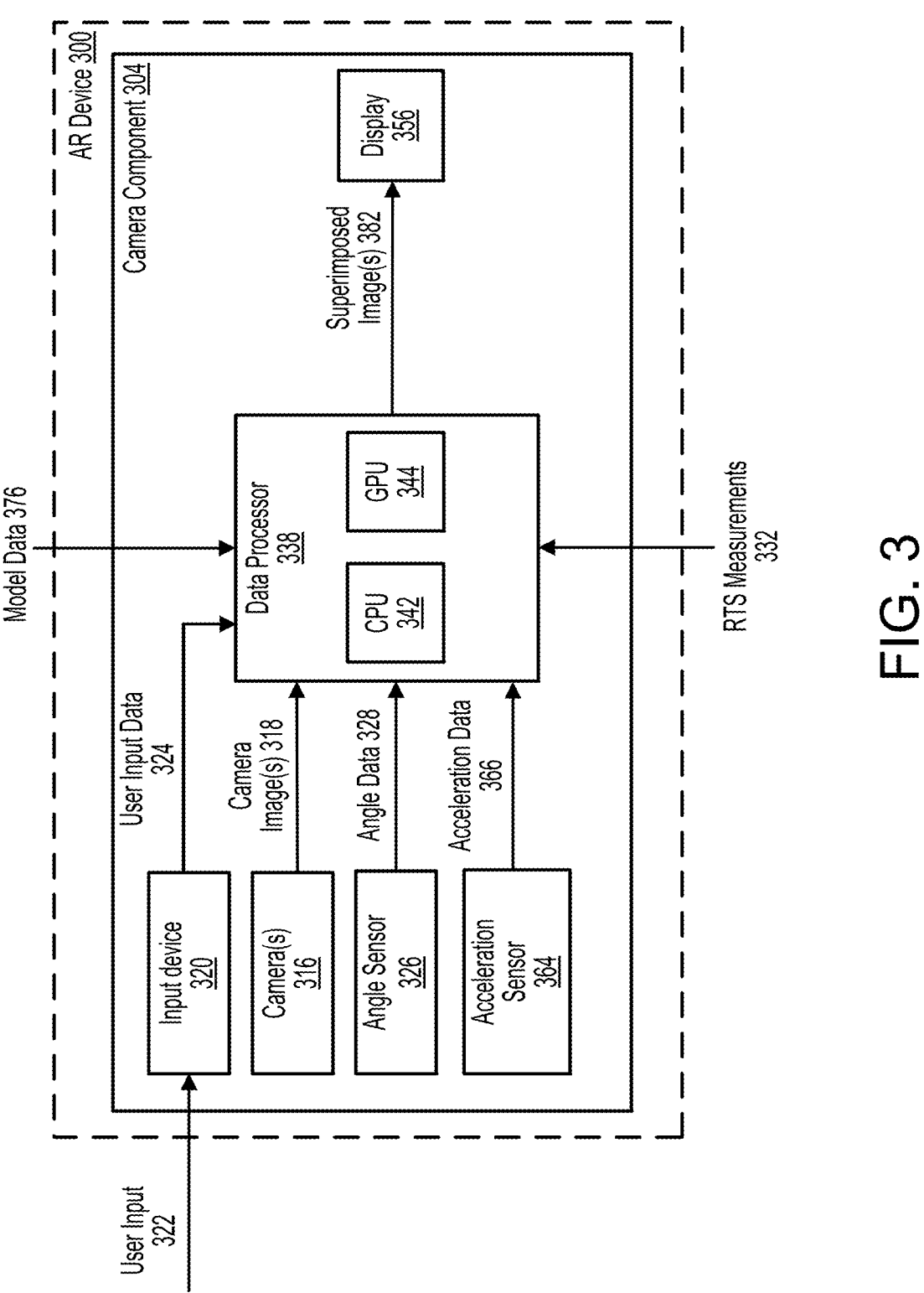
FIG. 3 illustrates a block diagram of an AR device including a camera component.

FIG. 3 illustrates a block diagram of an AR device 300 including a camera component 304, according to some embodiments of the present disclosure. In some embodiments, camera component 304 includes an input device 320 for receiving a user input 322 and generating user input data 324 based on the user input. Input device 320 may be a button, a switch, a microphone, a touchscreen (e.g., integrated into a display 356), among other possibilities. User input 322 may indicate a point of interest (by, for example, moving a cursor being displayed on display 356 so as to indicate the point of interest). In some embodiments, camera component 304 includes a camera 316 for generating one or more camera images 318. Camera images 318 may include a single image, multiple images, a stream of images (e.g., a video), among other possibilities.

In some embodiments, camera component 304 includes an angle sensor 326 for generating angle data 328 corresponding to camera component 304 (and AR device 300). Angle sensor 326 may be any electronic device capable of detecting angular rate and/or angular position. In some embodiments, angle sensor 326 may directly detect angular rate and may integrate to obtain angular position, or alternatively angle sensor 326 may directly measure angular position and may determine a change in angular position (e.g., determine the derivative) to obtain angular rate. In many instances, angle sensor 326 is used to determine a yaw angle, a pitch angle, and/or a roll angle corresponding to camera component 304 (and AR device 300). Accordingly, in various embodiments angle data 328 may include one or more of a yaw angle, a pitch angle, a roll angle, an orientation, or raw data from which one or more angles and orientations may be calculated. Angle sensor 326 may include one or more gyroscopes and may be included as part of an inertial measurement unit (IMU).

In some embodiments, camera component 304 includes an acceleration sensor 364 for generating acceleration data 366 corresponding to camera component 304 (and AR device 300). Acceleration sensor 364 may be any electronic device capable of detecting linear acceleration. In some embodiments, acceleration sensor 364 may directly measure linear velocity and may determine a change in linear velocity (e.g., determine the derivative) to obtain linear acceleration. Alternatively or additionally, acceleration sensor 364 may directly measure linear position and may determine a change in linear position (e.g., determine the derivative) to obtain linear velocity, from which linear acceleration can be calculated. Acceleration data 366 may include one or more acceleration values or raw data from which one or more acceleration values may be calculated. Acceleration sensor 364 may include one or more accelerometers and may be included as part of an IMU.

In some embodiments, camera component 304 includes a data processor 338 that includes a central processing unit (CPU) 342 and/or a graphics processing unit (GPU) 344 for processing data and generating various outputs based on the processed data. For example, data processor 338 may generate a superimposed image 382 that is displayed by display

356. Data processor 338 may receive data from various sources, including but not limited to, model data 376, user input data 324 generated by input device 320, camera image 318 generated by camera 316, angle data 328 generated by angle sensor 326, acceleration data 366 generated by acceleration sensor 364, and RTS measurements 332 generated by an RTS and wirelessly transmitted to AR device 300. In some examples, RTS measurements 332 may include an angle and a distance from the RTS to a reflector of AR device 300. Data processor 338 may use multiple types of data to make position and orientation calculations. For example, data processor 338 may analyze one or more camera images 318 to supplement orientation calculations based on angle data 328 or position calculations based on RTS measurements 332. As another example, data processor 338 may use acceleration data 366 to supplement position calculations based on RTS measurements 332.

Figure 4:
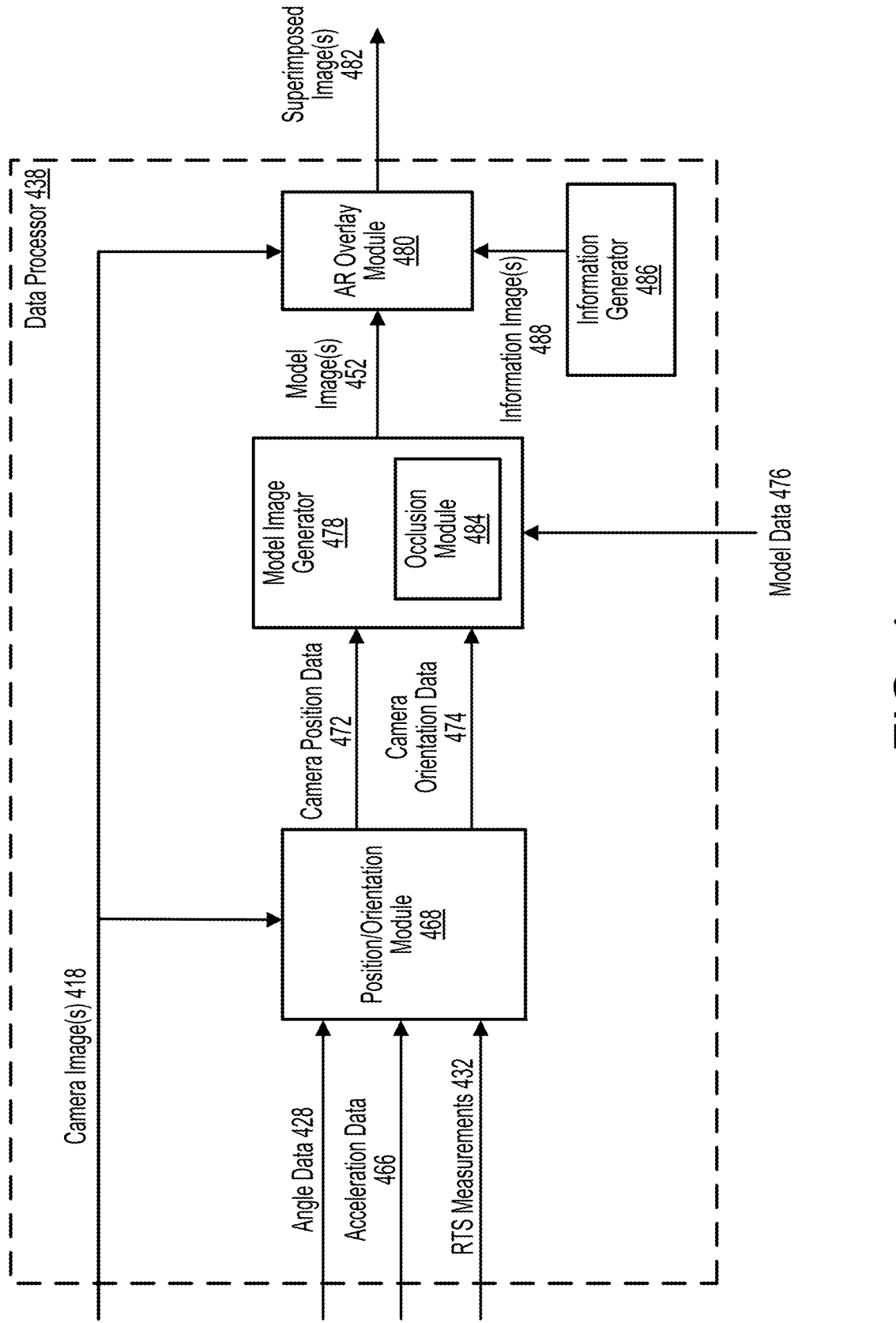
FIG. 4 illustrates a block diagram of a data processor.

FIG. 4 illustrates a block diagram of a data processor 438, according to some embodiments of the present disclosure. Each of the modules and generators illustrated in FIG. 4 may be implemented in hardware and/or software. In some embodiments, data processor 438 includes a position/orientation module 468 for determining camera position data 472 and camera orientation data 474. Camera position data 472 may include a 3D coordinate (e.g., three values) representing the relative position of a camera at a particular time. Similarly, camera orientation data 474 may include a 3D vector (e.g., three values) representing the orientation of the camera at a particular time. Position/orientation module 468 may be configured to output positions and orientations periodically, at non-regular intervals, or upon receiving updated data from one or more of angle data 428, acceleration data 466, RTS measurements 432, and camera image 418.

In some embodiments, position/orientation module 468 determines/updates camera position data 472 and camera orientation data 474 based on RTS measurements 432 each time new RTS measurements 432 are received (referred to as an "RTS point"). In some embodiments, position/orientation module 468 determines/updates camera position data 472 and camera orientation data 474 based on angle data 428, acceleration data 466, or camera image 418 each time new angle data 428, acceleration data 466, or camera image 418 are received (referred to as an "AR point"). In some instances, the performance of the AR device is improved when AR points and RTS points are conjunctively used to determine camera position data 472. In some instances, this is accomplished by maintaining two separate and independent reference frames: an AR reference frame (for tracking and handling AR points) and an RTS frame (for tracking and handling RTS points). The AR reference frame represents a camera space which maintains the relationship between different AR points. For example, a first AR point at a first time may be (0, 0, 0) within the AR reference frame, a second AR point at a second time may be (22.3, −12.6, 0) within the AR reference frame, and a third AR point at a third time may be (34.0, −22.9, −0.1) within the AR reference frame. Any operations performed on the AR reference frame, such as shifting or rotating, causes all points within the AR reference frame to be similarly affected. For example, shifting the AR reference frame by (0, 5, 0) would cause the three AR points to become (0, 5, 0), (22.3, −7.6, 0), and (34.0, −17.9, −0.1), respectively.

Similar to the AR reference frame, the RTS reference frame represents a RTS space which maintains the relationship between different RTS points (3D positions determined based on RTS measurements 432). For example, a first RTS point at a first time may be (10, 10, 10) within the RTS reference frame, a second RTS point at a second time may be (32.3, −2.6, 10) within the RTS reference frame, and a third RTS point at a third time may be (44.0, −12.9, 9.9) within the RTS reference frame. Any operations performed on the RTS reference frame, such as shifting or rotating, causes all points within the RTS reference frame to be similarly affected. For example, shifting the RTS reference frame by (0, 5, 0) would cause the three RTS points to become (10, 15, 10), (32.3, 2.4, 10), and (44.0, −7.9, 9.9), respectively.

In an ideal scenario, AR points and RTS points would be generated by position/orientation module 468 simultaneously and would be identical to each other. However, due to the differences between the two technologies, this is generally not the case. For example, RTS measurements 432 are generally received less frequently than camera images 418. Furthermore, because of the initialization issues associated with image-based pose data (and also due to its drift over time and distance), the AR reference frame and the RTS reference frame do not necessarily correspond to each other and therefore must be reconciled. To resolve these issues, among others, position/orientation module 468 may perform a series of steps in order to determine camera position data 472 and camera orientation data 474 that incorporate each of camera images 418, angle data 428, acceleration data 466, and RTS measurements 432.

In some embodiments, data processor 438 includes a model image generator 478 for generating a model image 452. In some instances, model image generator 478 receives model data 476 which defines a model (e.g., a building, a structure, utilities, etc.) via a wired or wireless connection. Model data 476 may include 3D coordinates corresponding to the model as well as other information for generating model image 452, such as colors, textures, lighting, etc. In some embodiments, model image generator 478 generates model image 452 based on each of camera position data 472, camera orientation data 474, and model data 476. For example, as the camera position and/or orientation changes, model image 452 may also be modified to accurately reflect the difference in position and/or orientation (e.g., as the position of the camera gets further away from the position of the model, model image 452 may become smaller). In some embodiments, model image 452 is held static until a change in one or more of camera position data 472, camera orientation data 474, and model data 476 is detected by model image generator 478. In some embodiments, portions of model image 452 may be occluded by an occlusion module 484 when real-world objects are positioned in front of the 3D model. In some embodiments, occlusion module 484 may occlude camera image 418 when the 3D model is positioned in front of real-world objects.

In some embodiments, data processor 438 includes an AR overlay module 480 for generating a superimposed image 482 by superimposing model image 452 onto camera image 418 (or by superimposing camera image 418 onto model image 452). In some instances, superimposed image 482 is output to a display which displays superimposed image 482 for viewing by a user. In some instances, a user may select whether or not model image 452 is visible on the display or whether any transparency is applied to model image 452 or camera image 418. In some embodiments, data processor 438 includes an information generator 486 for generating information that may be added to superimposed image 482. For example, information generator 486 may generate an information image 488 that may visually display the position of the AR device, the orientation of the AR device, information about a point of interest, information about the model, among other possibilities. Accordingly, superimposed image 482 may be generated to include portions of camera image 418, model image 452, and/or information image 488.

Figure 5A:
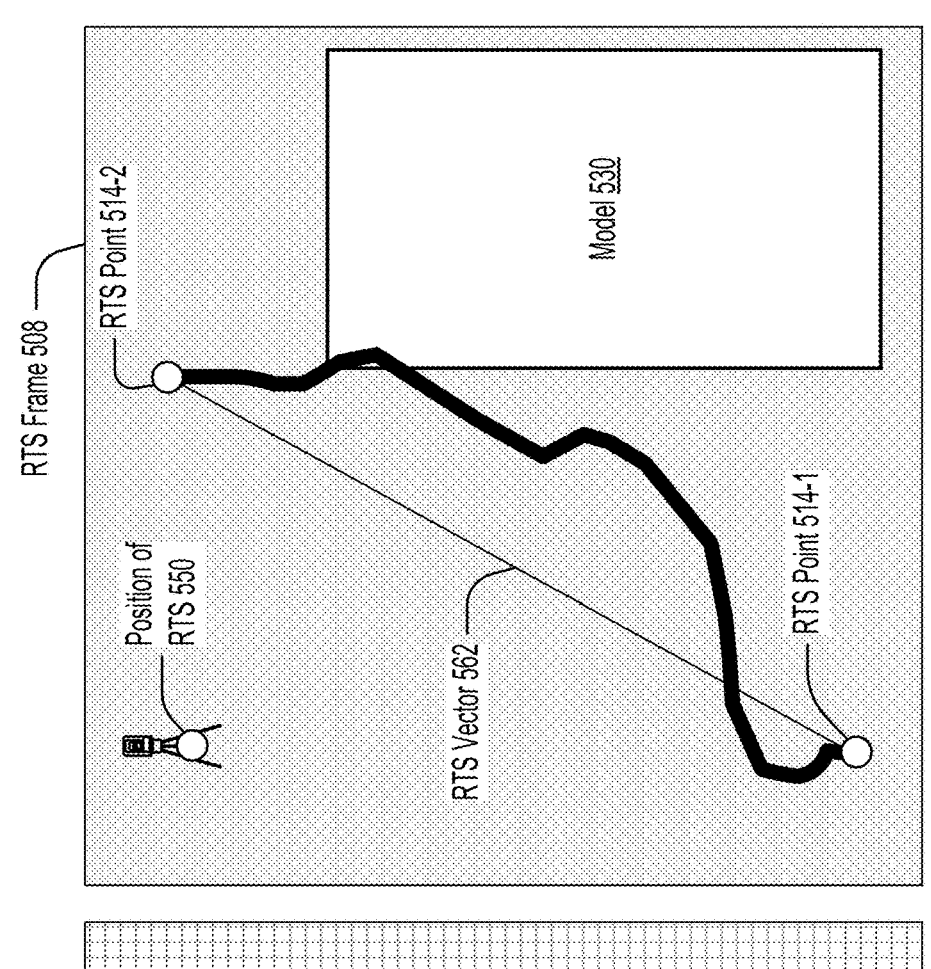
FIGS. 5A and 5B illustrate example steps for correlating an AR reference frame with an RTS frame.
Figure 5A:
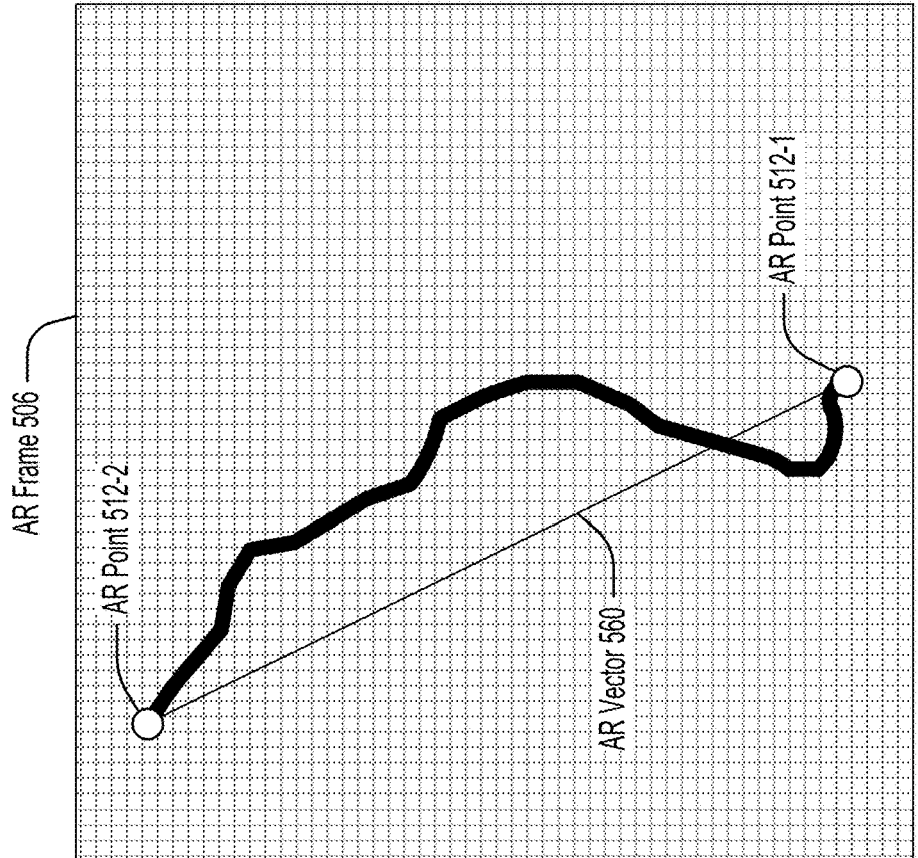
Figure 5B:
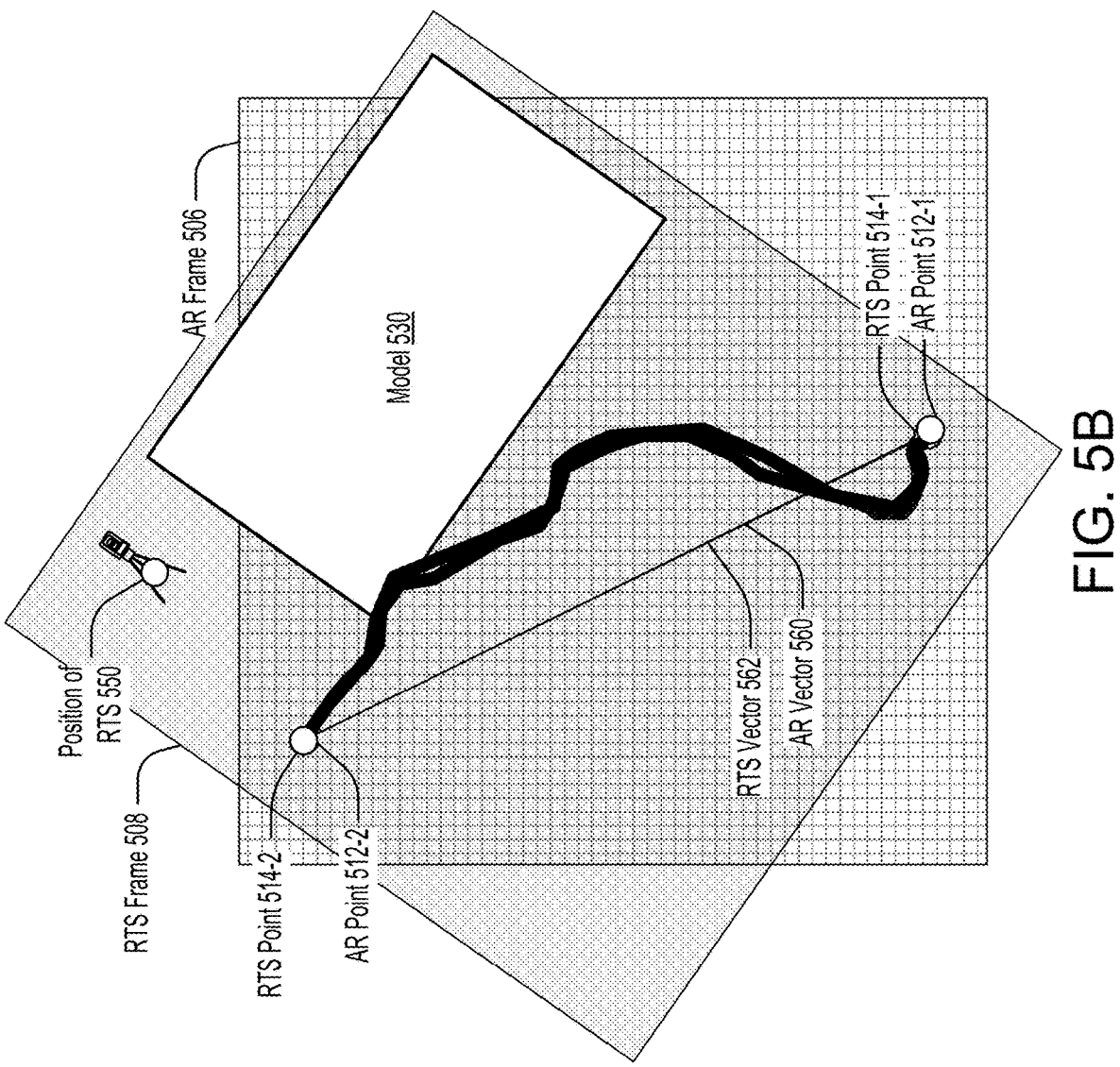

FIGS. 5A and 5B illustrate example steps for correlating an AR reference frame 506 with an RTS reference frame 508, according to some embodiments of the present disclosure. Referring to FIG. 5A, an RTS point 514-1 within RTS reference frame 508 and an AR point 512-1 within AR reference frame 506 may be determined at a first time, and an RTS point 514-2 within RTS reference frame 508 and an AR point 512-2 within AR reference frame 506 may be determined at a second time after the first time. Between the first time and the second time, additional points may be determined for both frames (as shown by the two thick solid lines). In some embodiments, the second time may be when an additional RTS point becomes available after the first time. For example, although AR points may be determined on the milliseconds timescale, RTS points may only be available every few seconds.

In some embodiments, a model 530 as defined by model data may be registered within RTS reference frame 508 as shown in FIG. 5A. A position of an RTS 550 may be known within RTS reference frame 508 or may be determined as described herein. As RTS reference frame 508 is shifted and/or rotated, each of model 530, and the position of RTS 550 may be shifted and/or rotated along with RTS reference frame 508. To facilitate the manipulation of the reference frames, an RTS vector 562 may be formed between RTS points 514 and similarly an AR vector 560 may be formed between AR points 512.

Referring to FIG. 5B, one or both of RTS reference frame 508 and AR reference frame 506 may be shifted such that RTS point 514-2 is aligned with AR point 512-2, and either RTS reference frame 508 is rotated to AR reference frame 506 or AR reference frame 506 is rotated to RTS reference frame 508 by an angle, causing RTS vector 562 to become aligned with AR vector 560. Alignment may occur over several dimensions. For example, RTS reference frame 508 may be shifted in each of three dimensions. Upon alignment of RTS point 514-2 with AR point 512-2, RTS vector 562 becomes aligned with AR vector 560 on at least one end of RTS vector 562. Rotation of the frames may occur over several dimensions. For example, RTS reference frame 508 may be rotated in each of three dimensions.

Figure 6:
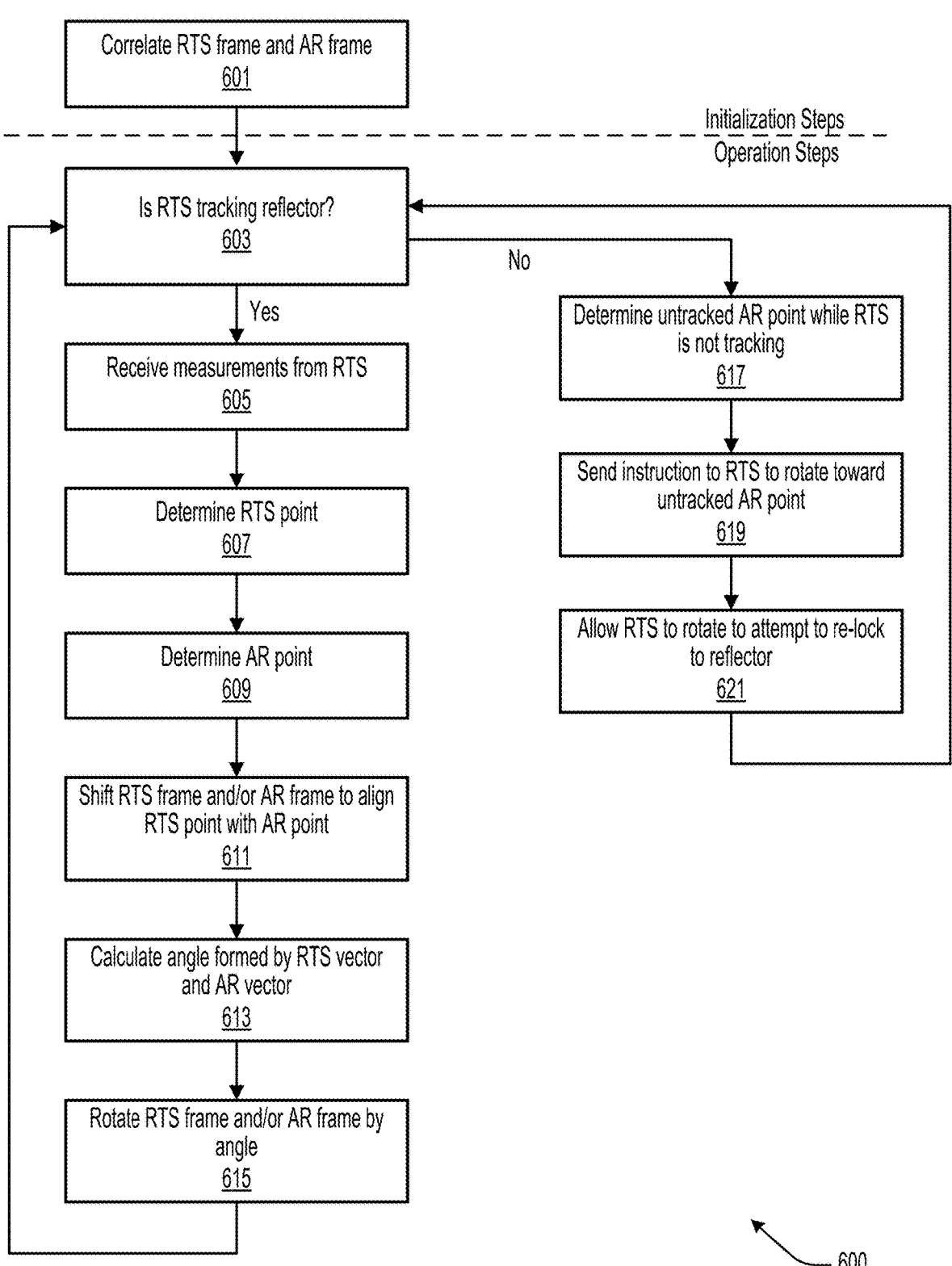
FIG. 6 illustrates a method of initializing and operating an AR device.

FIG. 6 illustrates a method 600 of initializing and operating an AR device (e.g., AR devices 100, 200, 300), according to some embodiments of the present disclosure. One or more steps of method 600 may be omitted during performance of method 600, and steps of method 600 may be performed in any order and/or in parallel. One or more steps of method 600 may be performed by one or more processors, such as those included in a data processor (e.g., data processor 338). Method 600 may be implemented as a computer-readable medium or computer program product comprising instructions which, when the program is executed by one or more computers, cause the one or more computers to carry out the steps of method 600.

At step 601, an RTS reference frame (e.g., RTS reference frame 508) is correlated with an AR reference frame (e.g., AR reference frame 506) to initialize the AR device. Step 601 may include performing method 700 described in reference to FIG. 7. A model (e.g., model 530) to be displayed by the AR device may be defined by a series of points, lines, surfaces, and volumes within the RTS reference frame.

Correlating the RTS reference frame with the AR reference frame effectively maps the model to the AR reference frame.

At step 603, it is determined whether an RTS (e.g., RTSs 150, 550) is currently tracking a reflector (e.g., reflectors 110, 210) of the AR device. The reflector may be an element of a target component (e.g., target components 102, 202) of the AR device, which may also include a camera component (e.g., camera components 104, 204, 304) having a camera (e.g., cameras 216, 316), an angle sensor (e.g., angle sensor 326), and/or an acceleration sensor (e.g., acceleration sensor 364). While tracking the reflector, the RTS may be able to perform measurements and computations with respect to the reflector. For example, the RTS may measure the slope distance and the angles to the reflector. In some examples, the RTS may include a pixelated image sensor that captures a matrix of light values that may be used to determine the center point of the reflector. If it is determined that the RTS is currently tracking the reflector, method 600 proceeds to step 605. If it is determined that the RTS is not currently tracking the reflector, method 600 proceeds to step 617.

At step 605, the RTS measures a distance and an angle to the reflector and wirelessly transmits these RTS measurements (e.g., RTS measurements 332, 432) to the AR device. Further at step 605, the RTS measurements including the distance and the angle are received by the AR device.

At step 607, the AR device determines an RTS point (e.g., RTS point 514-2) within the RTS reference frame based on the distance and the angle measured by the RTS. The RTS point may be a position of the AR device within the RTS reference frame. The RTS point may be determined further based on a known position of the RTS within the RTS reference frame.

At step 609, the AR device determines an AR point (e.g., AR point 512-2) within the AR reference frame based on a set of vision-based or inertia-based measurements including one or more camera images (e.g., camera images 118, 318, 418) captured by the camera, angle data (e.g., angle data 328, 428) captured by the angle sensor, and/or acceleration data (e.g., acceleration data 366, 466) captured by the acceleration sensor. For example, the AR point may be determined using visual odometry, visual inertial odometry (VIO), or simultaneous localization and mapping (SLAM) techniques. The AR point may be a position of the AR device within the AR reference frame.

At step 611, the AR device shifts the RTS reference frame and/or the AR reference frame to align the RTS point with the AR point. The RTS reference frame and/or the AR reference frame may be shifted in at least one of three dimensions. Shifting the RTS reference frame and/or the AR reference frame in a particular dimension causes all points in the RTS reference frame and/or the AR reference frame to be translated by a particular amount.

At step 613, an angle between an RTS vector (e.g., RTS vector 562) and an AR vector (e.g., AR vector 560) is calculated. The RTS vector may be formed between the (current) RTS point and a previous RTS point (e.g., RTS point 514-1) and the AR vector may be formed between the (current) AR point and a previous AR point (e.g., AR point 512-1).

At step 615, the RTS reference frame and/or the AR reference frame is rotated by the angle to align the RTS vector with the AR vector. The RTS reference frame and/or the AR reference frame may be rotated in at least one of three dimensions. Rotating the RTS reference frame and/or the AR reference frame in a particular dimension causes all points in the RTS reference frame and/or the AR reference frame (except for the RTS point and/or the AR point) to be rotated with respect to the RTS point and/or the AR point. After step 615 is performed, method 600 may return to step 603.

At step 617, the AR device determines an untracked AR point within the AR reference frame while the RTS is not tracking based on camera images (e.g., camera images 118, 318, 418) captured by the camera, angle data (e.g., angle data 328, 428) captured by the angle sensor, and/or acceleration data (e.g., acceleration data 366, 466) captured by the acceleration sensor. The untracked AR point may be a position of the AR device within the AR reference frame.

At step 619, the AR device generates and sends an instruction to the RTS to cause a telescope (e.g., telescope 170) of the RTS to rotate about a horizontal and/or a vertical axis such that an optical path (e.g., optical path 154) of the telescope is directed toward the untracked AR point.

At step 621, the AR device allows the RTS to rotate to attempt to re-lock onto the reflector of the AR device. After step 621 is performed, method 600 may return to step 603.

In some embodiments, method 600 further includes a model image generator (e.g., model image generator 478) generating a model image (e.g., model image 152, 452) based on model data (e.g., model data 476), the shift performed in step 611, the rotation performed in step 615, camera position data (e.g., camera position data 472), and/or camera orientation data (e.g., camera orientation data 474). In some embodiments, method 600 further includes an AR overlay module (e.g., AR overlay module 480) generating a superimposed image (e.g., superimposed image 182, 482) by superimposing the model image onto the camera image and displaying the superimposed image.

Figure 7:
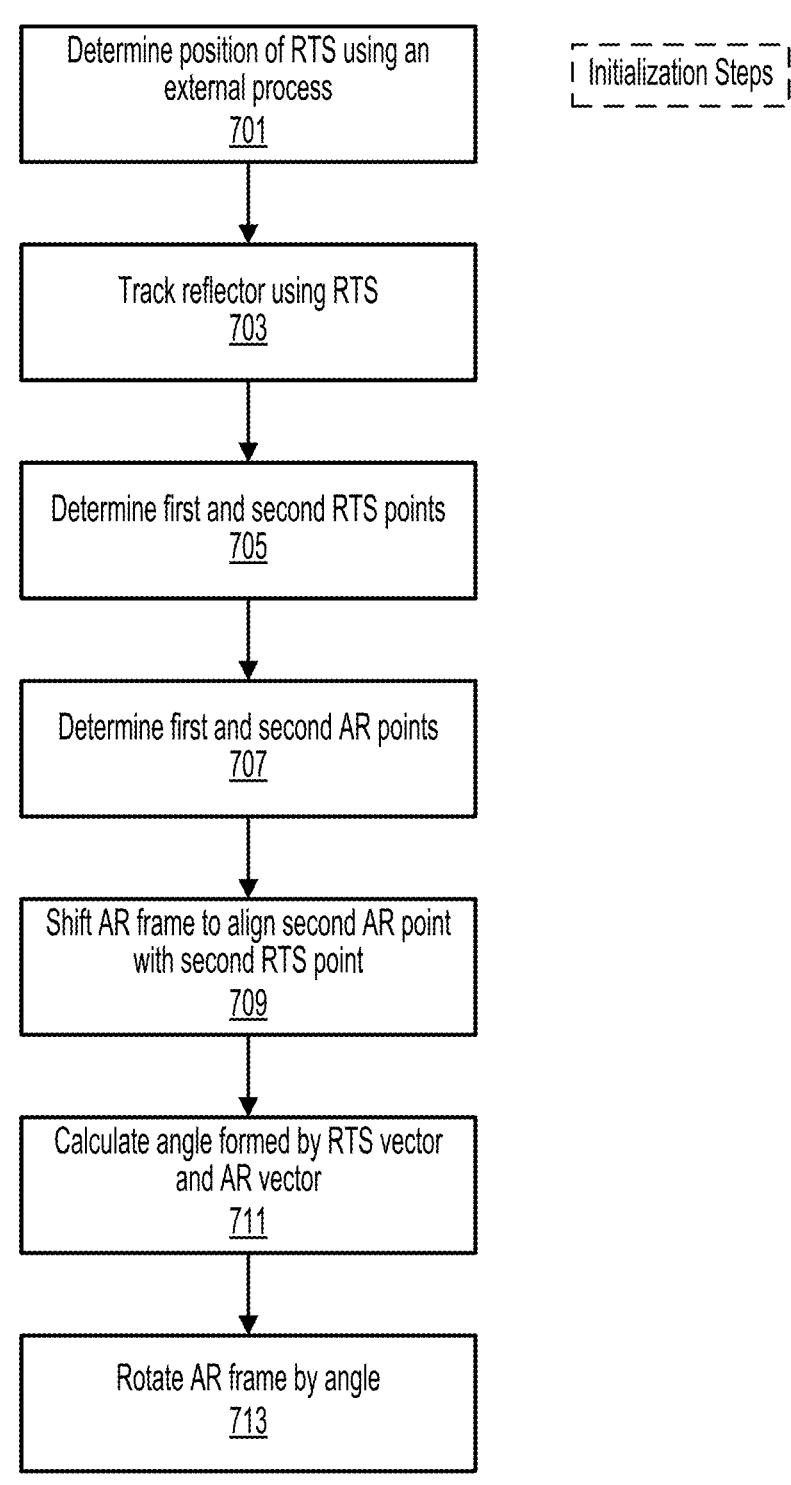
FIG. 7 illustrates a method of correlating an RTS reference frame with an AR reference frame to initialize an AR device.

FIG. 7 illustrates a method 700 of correlating an RTS reference frame (e.g., RTS reference frame 508) with an AR reference frame (e.g., AR reference frame 506) to initialize an AR device (e.g., AR devices 100, 200, 300), according to some embodiments of the present disclosure. One or more steps of method 700 may be omitted during performance of method 700, and steps of method 700 may be performed in any order and/or in parallel. One or more steps of method 700 may be performed by one or more processors, such as those included in a data processor (e.g., data processor 338). Method 700 may be implemented as a computer-readable medium or computer program product comprising instructions which, when the program is executed by one or more computers, cause the one or more computers to carry out the steps of method 700.

At step 701, the AR device determines the position of an RTS (e.g., RTSs 150, 550) within the RTS reference frame using an external process. For example, the RTS may be positioned at a known position that may be communicated with the AR device (e.g., transmitted by a remote server to the AR device).

At step 703, the RTS tracks a reflector (e.g., reflectors 110, 210) of the AR device. The reflector may be an element of a target component (e.g., target components 102, 202) of the AR device, which may also include a camera component (e.g., camera components 104, 204, 304) having a camera (e.g., cameras 216, 316), an angle sensor (e.g., angle sensor 326), and/or an acceleration sensor (e.g., acceleration sensor 364). While tracking the reflector, the RTS may be able to perform measurements and computations with respect to the reflector. For example, the RTS may measure the slope distance and the angles to the reflector. In some examples, the RTS may include a pixelated image sensor that captures a matrix of light values that may be used to determine the center point of the reflector.

At step 705, the RTS measures a first distance and a first angle to the reflector to determine a first RTS point (e.g., RTS point 514-1) within the RTS reference frame and a second distance and a second angle to the reflector to determine a second RTS point (e.g., RTS point 514-2) within the RTS reference frame. The first and second distances and the first and second angles may be wirelessly transmitted from the RTS to the AR device, which may determine positions of the AR device with respect to the RTS using the distances and the angles. Using the position of the RTS within the RTS reference frame, the AR device may convert the positions of the AR device with respect to the RTS into positions of the AR device within the RTS reference frame.

At step 707, the AR device determines a first AR point (e.g., AR point 512-1) and a second AR point (e.g., AR point 512-2) within the AR reference frame. The first and second AR points may be determined based on a set of vision-based or inertia-based measurements including one or more camera images (e.g., camera images 118, 318, 418) captured by the camera of the camera component, angle data (e.g., angle data 328, 428) captured by the angle sensor, and/or acceleration data (e.g., acceleration data 366, 466) captured by the acceleration sensor. For example, the first and second AR points may be determined using visual odometry, VIO, or SLAM techniques. The first AR point may be closely aligned with the first RTS point in time (e.g., within a threshold time of each other) and the second AR point may be closely aligned with the second RTS point in time (e.g., within a threshold time of each other).

At step 709, the AR device shifts the AR reference frame to align the second AR point with the second RTS point. The AR reference frame may be shifted in at least one of three dimensions. Shifting the AR reference frame in a particular dimension causes all points in the AR reference frame to be translated by a particular amount.

At step 711, an angle between an AR vector (e.g., AR vector 560) and an RTS vector (e.g., RTS vector 562) is calculated. The AR vector may be formed between the first and second AR points and the RTS vector may be formed between the first and second RTS points.

At step 713, the AR reference frame is rotated by the angle to align the AR vector with the RTS vector. The AR reference frame may be rotated in at least one of three dimensions. Rotating the AR reference frame in a particular dimension causes all points in the AR reference frame (except for the second AR point) to be rotated with respect to the second AR point.

Figure 8:
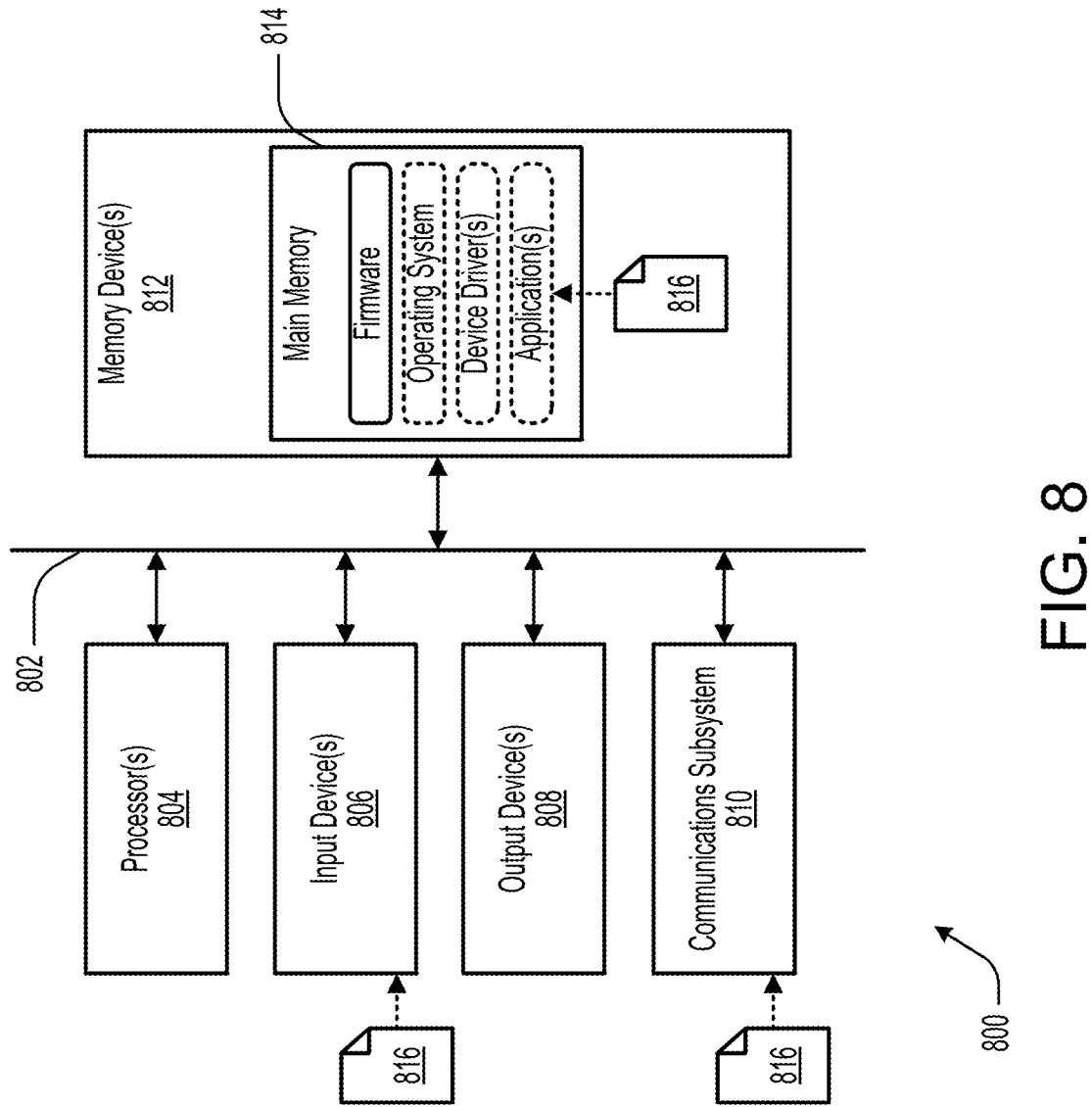
FIG. 8 illustrates an example computer system comprising various hardware elements.

FIG. 8 illustrates an example computer system 800 comprising various hardware elements, according to some embodiments of the present disclosure. Computer system 800 may be incorporated into or integrated with devices described herein and/or may be configured to perform some or all of the steps of the methods provided by various embodiments. For example, in various embodiments, computer system 800 may be incorporated into the AR device and/or may be configured to perform the described initialization or operation steps. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

In the illustrated example, computer system 800 includes a communication medium 802, one or more processor(s) 804, one or more input device(s) 806, one or more output device(s) 808, a communications subsystem 810, and one or more memory device(s) 812. Computer system 800 may be implemented using various hardware implementations and embedded system technologies. For example, one or more elements of computer system 800 may be implemented within an integrated circuit (IC), an application-specific integrated circuit (ASIC), an application-specific standard product (ASSP), a field-programmable gate array (FPGA), such as those commercially available by XILINX®, INTEL®, or LATTICE SEMICONDUCTOR®, a system-on-a-chip (SoC), a microcontroller, a printed circuit board (PCB), and/or a hybrid device, such as an SoC FPGA, among other possibilities.

The various hardware elements of computer system 800 may be communicatively coupled via communication medium 802. While communication medium 802 is illustrated as a single connection for purposes of clarity, it should be understood that communication medium 802 may include various numbers and types of communication media for transferring data between hardware elements. For example, communication medium 802 may include one or more wires (e.g., conductive traces, paths, or leads on a PCB or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 802 may include one or more buses that connect the pins of the hardware elements of computer system 800. For example, communication medium 802 may include a bus that connects processor(s) 804 with main memory 814, referred to as a system bus, and a bus that connects main memory 814 with input device(s) 806 or output device(s) 808, referred to as an expansion bus. The system bus may itself consist of several buses, including an address bus, a data bus, and a control bus. The address bus may carry a memory address from processor(s) 804 to the address bus circuitry associated with main memory 814 in order for the data bus to access and carry the data contained at the memory address back to processor(s) 804. The control bus may carry commands from processor(s) 804 and return status signals from main memory 814. Each bus may include multiple wires for carrying multiple bits of information and each bus may support serial or parallel transmission of data.

Processor(s) 804 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. Processor(s) 804 may include one or more multi-core processors, in which each core may read and execute program instructions concurrently with the other cores, increasing speed for programs that support multithreading.

Input device(s) 806 may include one or more of various user input devices such as a mouse, a keyboard, a microphone, as well as various sensor input devices, such as an image capture device, a temperature sensor (e.g., thermometer, thermocouple, thermistor), a pressure sensor (e.g., barometer, tactile sensor), a movement sensor (e.g., accelerometer, gyroscope, tilt sensor), a light sensor (e.g., photodiode, photodetector, charge-coupled device), and/or the like. Input device(s) 806 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 808 may include one or more of various devices that convert information into human-readable form, such as without limitation a display device, a speaker, a printer, a haptic or tactile device, and/or the like. Output device(s) 808 may also include devices for writing to removable storage devices or other removable media, such as those described in reference to input device(s) 806. Output device(s) 808 may also include various actuators for causing physical movement of one or more components. Such actuators may be hydraulic, pneumatic, electric, and may be controlled using control signals generated by computer system 800.

Communications subsystem 810 may include hardware components for connecting computer system 800 to systems or devices that are located external to computer system 800, such as over a computer network. In various embodiments, communications subsystem 810 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 812 may include the various data storage devices of computer system 800. For example, memory device(s) 812 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While processor(s) 804 and memory device(s) 812 are illustrated as being separate elements, it should be understood that processor(s) 804 may include varying levels of on-processor memory, such as processor registers and caches that may be utilized by a single processor or shared between multiple processors.

Memory device(s) 812 may include main memory 814, which may be directly accessible by processor(s) 804 via the address and data buses of communication medium 802. For example, processor(s) 804 may continuously read and execute instructions stored in main memory 814. As such, various software elements may be loaded into main memory 814 to be read and executed by processor(s) 804 as illustrated in FIG. 8. Typically, main memory 814 is volatile memory, which loses all data when power is turned off and accordingly needs power to preserve stored data. Main memory 814 may further include a small portion of non-volatile memory containing software (e.g., firmware, such as BIOS) that is used for reading other software stored in memory device(s) 812 into main memory 814. In some embodiments, the volatile memory of main memory 814 is implemented as RAM, such as dynamic random-access memory (DRAM), and the non-volatile memory of main memory 814 is implemented as read-only memory (ROM), such as flash memory, erasable programmable read-only memory (EPROM), or electrically erasable programmable read-only memory (EEPROM).

Computer system 800 may include software elements, shown as being currently located within main memory 814, which may include an operating system, device driver(s), firmware, compilers, and/or other code, such as one or more application programs, which may include computer pro- grams provided by various embodiments of the present disclosure. Merely by way of example, one or more steps described with respect to any methods discussed above, may be implemented as instructions 816, which are executable by computer system 800. In one example, such instructions 816 may be received by computer system 800 using communi- cations subsystem 810 (e.g., via a wireless or wired signal that carries instructions 816), carried by communication medium 802 to memory device(s) 812, stored within memory device(s) 812, read into main memory 814, and executed by processor(s) 804 to perform one or more steps of the described methods. In another example, instructions 816 may be received by computer system 800 using input device(s) 806 (e.g., via a reader for removable media), carried by communication medium 802 to memory device(s) 812, stored within memory device(s) 812, read into main memory 814, and executed by processor(s) 804 to perform one or more steps of the described methods.

In some embodiments of the present disclosure, instruc- tions 816 are stored on a computer-readable storage medium (or simply computer-readable medium). Such a computer- readable medium may be non-transitory and may therefore be referred to as a non-transitory computer-readable medium. In some cases, the non-transitory computer-read- able medium may be incorporated within computer system 800. For example, the non-transitory computer-readable medium may be one of memory device(s) 812 (as shown in FIG. 8). In some cases, the non-transitory computer-read- able medium may be separate from computer system 800. In one example, the non-transitory computer-readable medium may be a removable medium provided to input device(s) 806 (as shown in FIG. 8), such as those described in reference to input device(s) 806, with instructions 816 being read into computer system 800 by input device(s) 806. In another example, the non-transitory computer-readable medium may be a component of a remote electronic device, such as a mobile phone, that may wirelessly transmit a data signal that carries instructions 816 to computer system 800 and that is received by communications subsystem 810 (as shown in FIG. 8).

Instructions 816 may take any suitable form to be read and/or executed by computer system 800. For example, instructions 816 may be source code (written in a human- readable programming language such as Java, C, C++, C#, Python), object code, assembly language, machine code, microcode, executable code, and/or the like. In one example, instructions 816 are provided to computer system 800 in the form of source code, and a compiler is used to translate instructions 816 from source code to machine code, which may then be read into main memory 814 for execution by processor(s) 804. As another example, instructions 816 are provided to computer system 800 in the form of an execut- able file with machine code that may immediately be read into main memory 814 for execution by processor(s) 804. In various examples, instructions 816 may be provided to computer system 800 in encrypted or unencrypted form, compressed or uncompressed form, as an installation pack- age or an initialization for a broader software deployment, among other possibilities.

In one aspect of the present disclosure, a system (e.g., computer system 800) is provided to perform methods in accordance with various embodiments of the present disclosure. For example, some embodiments may include a system comprising one or more processors (e.g., processor(s) 804) that are communicatively coupled to a non-transitory com- puter-readable medium (e.g., memory device(s) 812 or main memory 814). The non-transitory computer-readable medium may have instructions (e.g., instructions 816) stored therein that, when executed by the one or more processors, cause the one or more processors to perform the methods described in the various embodiments.

In another aspect of the present disclosure, a computer- program product that includes instructions (e.g., instructions 816) is provided to perform methods in accordance with various embodiments of the present disclosure. The com- puter-program product may be tangibly embodied in a non-transitory computer-readable medium (e.g., memory device(s) 812 or main memory 814). The instructions may be configured to cause one or more processors (e.g., pro- cessor(s) 804) to perform the methods described in the various embodiments.

In another aspect of the present disclosure, a non-transi- tory computer-readable medium (e.g., memory device(s) 812 or main memory 814) is provided. The non-transitory computer-readable medium may have instructions (e.g., instructions 816) stored therein that, when executed by one or more processors (e.g., processor(s) 804), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configura- tions may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations includ- ing implementations. However, configurations may be prac- ticed without these specific details. For example, well- known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the dis- closure. For example, the above elements may be compo- nents of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of operating an augmented reality (AR) device using a robotic total station (RTS), the method comprising:

correlating an RTS reference frame with an AR reference frame, the RTS reference frame for tracking positions of the AR device with RTS measurements and the AR reference frame for tracking positions of the AR device with vision-based or inertia-based measurements;

receiving a set of RTS measurements from the RTS including a distance and an angle from the RTS to a reflector of the AR device;

determining an RTS point within the RTS reference frame based on the distance and the angle;

determining an AR point within the AR reference frame based on a set of vision-based or inertia-based measurements;

shifting the RTS reference frame and/or the AR reference frame to align the RTS point with the AR point;

rotating the RTS reference frame and/or the AR reference frame to align an RTS vector formed using the RTS point with an AR vector formed using the AR point;

determining whether the RTS is tracking the reflector of the AR device at a first time;

in response to determining that the RTS is not tracking the reflector of the AR device at the first time:

determining an untracked AR point within the AR reference frame; and sending an instruction to the RTS to cause the RTS to rotate toward the untracked AR point.

2. The method of claim 1, wherein the RTS vector is formed between the RTS point and a previous RTS point, and wherein the AR vector is formed between the AR point and a previous AR point.

3. The method of claim 1, further comprising:

generating a model image based on model data, the shifting of the RTS reference frame and/or the AR reference frame, and the rotating of the RTS reference frame and/or the AR reference frame; and generating a superimposed image by superimposing the model image onto a camera image generated by a camera; and displaying the superimposed image.

4. The method of claim 1, further comprising:

determining whether the RTS is tracking the reflector of the AR device at a second time after the first time; and in response to determining that the RTS is tracking the reflector of the AR device at the second time, determining the RTS point and the AR point.

5. The method of claim 1, wherein the AR device comprises a camera component including a camera and a target component including the reflector, and wherein the camera component is separable from and configured to removably attach to the target component.

6. The method of claim 1, further comprising:

calculating an angle formed by the RTS vector and the AR vector, wherein the RTS reference frame and/or the AR reference frame is rotated by the angle.

7. A non-transitory computer-readable medium comprising instructions that, when executed by one or more processors, cause the one or more processors to perform operations for operating an augmented reality (AR) device using a robotic total station (RTS), the operations comprising:

correlating an RTS reference frame with an AR reference frame, the RTS reference frame for tracking positions of the AR device with RTS measurements and the AR reference frame for tracking positions of the AR device with vision-based or inertia-based measurements;

receiving a set of RTS measurements from the RTS including a distance and an angle from the RTS to a reflector of the AR device;

determining an RTS point within the RTS reference frame based on the distance and the angle;

determining an AR point within the AR reference frame based on a set of vision-based or inertia-based measurements;

shifting the RTS reference frame and/or the AR reference frame to align the RTS point with the AR point;

rotating the RTS reference frame and/or the AR reference frame to align an RTS vector formed using the RTS point with an AR vector formed using the AR point;

determining whether the RTS is tracking the reflector of the AR device at a first time;

in response to determining that the RTS is not tracking the reflector of the AR device at the first time:

determining an untracked AR point within the AR reference frame; and sending an instruction to the RTS to cause the RTS to rotate toward the untracked AR point.

8. The non-transitory computer-readable medium of claim 7, wherein the RTS vector is formed between the RTS point and a previous RTS point, and wherein the AR vector is formed between the AR point and a previous AR point.

9. The non-transitory computer-readable medium of claim 7, wherein the operations further comprise:

generating a model image based on model data, the shifting of the RTS reference frame and/or the AR reference frame, and the rotating of the RTS reference frame and/or the AR reference frame; and generating a superimposed image by superimposing the model image onto a camera image generated by a camera; and displaying the superimposed image.

10. The non-transitory computer-readable medium of claim 7, wherein the operations further comprise:

determining whether the RTS is tracking the reflector of the AR device at a second time after the first time; and in response to determining that the RTS is tracking the reflector of the AR device at the second time, determining the RTS point and the AR point.

11. The non-transitory computer-readable medium of claim 7, wherein the AR device comprises a camera component including a camera and a target component including the reflector, and wherein the camera component is separable from and configured to removably attach to the target component.

12. The non-transitory computer-readable medium of claim 7, wherein the operations further comprise:

calculating an angle formed by the RTS vector and the AR vector, wherein the RTS reference frame and/or the AR reference frame is rotated by the angle.

13. A system comprising:

one or more processors; and a non-transitory computer-readable medium comprising instructions that, when executed by the one or more processors, cause the one or more processors to perform operations for operating an augmented reality (AR) device using a robotic total station (RTS), the operations comprising:

correlating an RTS reference frame with an AR reference frame, the RTS reference frame for tracking positions of the AR device with RTS measurements and the AR reference frame for tracking positions of the AR device with vision-based or inertia-based measurements;

receiving a set of RTS measurements from the RTS including a distance and an angle from the RTS to a reflector of the AR device;

determining an RTS point within the RTS reference frame based on the distance and the angle;

determining an AR point within the AR reference frame based on a set of vision-based or inertia-based measurements;

shifting the RTS reference frame and/or the AR reference frame to align the RTS point with the AR point; and rotating the RTS reference frame and/or the AR reference frame to align an RTS vector formed using the RTS point with an AR vector formed using the AR point;

determining whether the RTS is tracking the reflector of the AR device at a first time;

in response to determining that the RTS is not tracking the reflector of the AR device at the first time:

determining an untracked AR point within the AR reference frame; and sending an instruction to the RTS to cause the RTS to rotate toward the untracked AR point.

14. The system of claim 13, wherein the RTS vector is formed between the RTS point and a previous RTS point, and wherein the AR vector is formed between the AR point and a previous AR point.

15. The system of claim 13, wherein the operations further comprise:

generating a model image based on model data, the shifting of the RTS reference frame and/or the AR reference frame, and the rotating of the RTS reference frame and/or the AR reference frame; and generating a superimposed image by superimposing the model image onto a camera image generated by a camera; and displaying the superimposed image.

16. The system of claim 13, wherein the operations further comprise:

determining whether the RTS is tracking the reflector of the AR device at a second time after the first time; and in response to determining that the RTS is tracking the reflector of the AR device at the second time, determining the RTS point and the AR point.

17. The system of claim 13, wherein the AR device comprises a camera component including a camera and a target component including the reflector, and wherein the camera component is separable from and configured to removably attach to the target component.

* * * * *